United States Patent
Chen (10) Patent No.: US 6,456,353 B1
(45) Date of Patent: Sep. 24, 2002

(54) DISPLAY DRIVER INTEGRATED CIRCUIT MODULE

(75) Inventor: Yen-Chen Chen, Tainan (TW)

(73) Assignee: Chi Mei Opto Electronics Corp., Tainan (TW)

( * ) Notice: Subject to any disclaimer, the term of this patent is extended or adjusted under 35 U.S.C. 154(b) by 0 days.

(21) Appl. No.: 09/434,860

(22) Filed: Nov. 4, 1999

(51) Int. Cl.[7] .............................................. G02F 1/1345
(52) U.S. Cl. ....................... 349/150; 349/151; 349/152; 349/149
(58) Field of Search ................................. 349/149, 150, 349/151, 152

(56) References Cited

U.S. PATENT DOCUMENTS

| | | | |
|---|---|---|---|
| 5,029,984 A | * | 7/1991 | Adachi et al. .............. 350/334 |
| 5,293,262 A | * | 3/1994 | Adachi et al. ................. 359/88 |
| 6,191,838 B1 | * | 2/2001 | Muramatsu ................. 349/149 |
| 6,284,086 B1 | * | 9/2001 | Cardellino et al. ......... 349/150 |

* cited by examiner

Primary Examiner—Kenneth Parker
Assistant Examiner—David Chung
(74) Attorney, Agent, or Firm—J. C. Pattent (57) ABSTRACT

Driver integrated circuits (ICs) are mounted on a flexible base film and electrically connected to it to form a display driver IC module. The display driver IC module is applicable to a liquid crystal module assembly. The flexible base film has an interconnecting wiring fabricated on it. Each driver IC is mounted to the flexible base film, and having a plurality of input/output pads electrically connected to the interconnecting wiring. Each driver IC is electrically connected to the corresponding input/output pads of the other driver ICs through the interconnecting wiring on the flexible base film.

13 Claims, 6 Drawing Sheets

DISPLAY DRIVER INTEGRATED CIRCUIT MODULE

BACKGROUND OF THE INVENTION

1. Field of Invention

The present invention relates to a display driver integrated circuit module. More particularly, the present invention relates to a flat liquid crystal display driver integrated circuit module.

2. Description of Related Art

Liquid crystal is a material in between a solid and a liquid. When affected by external electric fields, magnetic fields, or heat, molecular orientation of liquid crystal is changed. The photoelectric property of liquid crystal is also varied. The variation of photoelectric property due to externally applied fields can be adjusted, and hence, produces a visual effect that is adapted for the formation of a liquid crystal display (LCD).

A LCD has a low operating voltage, emits no radiation, is lightweight, has a small volume, and has a low power consumption, in addition to other properties. Therefore, LCDs are widely used in products such as portable TVs, mobile phones, camcorders, notebooks, desktop monitors, projection TVs, and other electronic commodities and computer products. It is expected that cathode ray tube (CRT) containing devices will be gradually replaced by LCD devices, and LCD devices will become the mainstream monitor product in the future.

The manufacturing process of a LCD has been being developed in following the trench of a higher contrast ratio, a wider viewing angle, a faster response speed, a higher resolution, a full color display, etc., which yet depend on, for example, the molecular structure of liquid crystal, the color filter, the thin film transistor (TFT), the polarizer, the encapsulant, the integrated circuit mounting technology, the packaging type, etc.

In order to fulfill the requirements of high resolution and miniaturization of electronic commodities, the packaging technique has been changed from the chip on board (COB) process to the tape automated bonding (TAB) process, and further changed into the chip on glass (COG) process, also called the flip chip on glass (FCOG) process, for a very fine pitch requirement.

The COB process is the most widely used process in the early LCDs manufacturing. A chip is mounted on a printed circuit board (PCB) by means of the wire bonding process and the surface mounted technology (SMT). Connections between the PCB with a chip and a liquid crystal panel are accomplished through a flexible printed circuit board (FPCB). Such processes involve the design of the PCB, the treatment of metal layers on connection points, and the requirement of the FPCB for connections.

Figure 1:
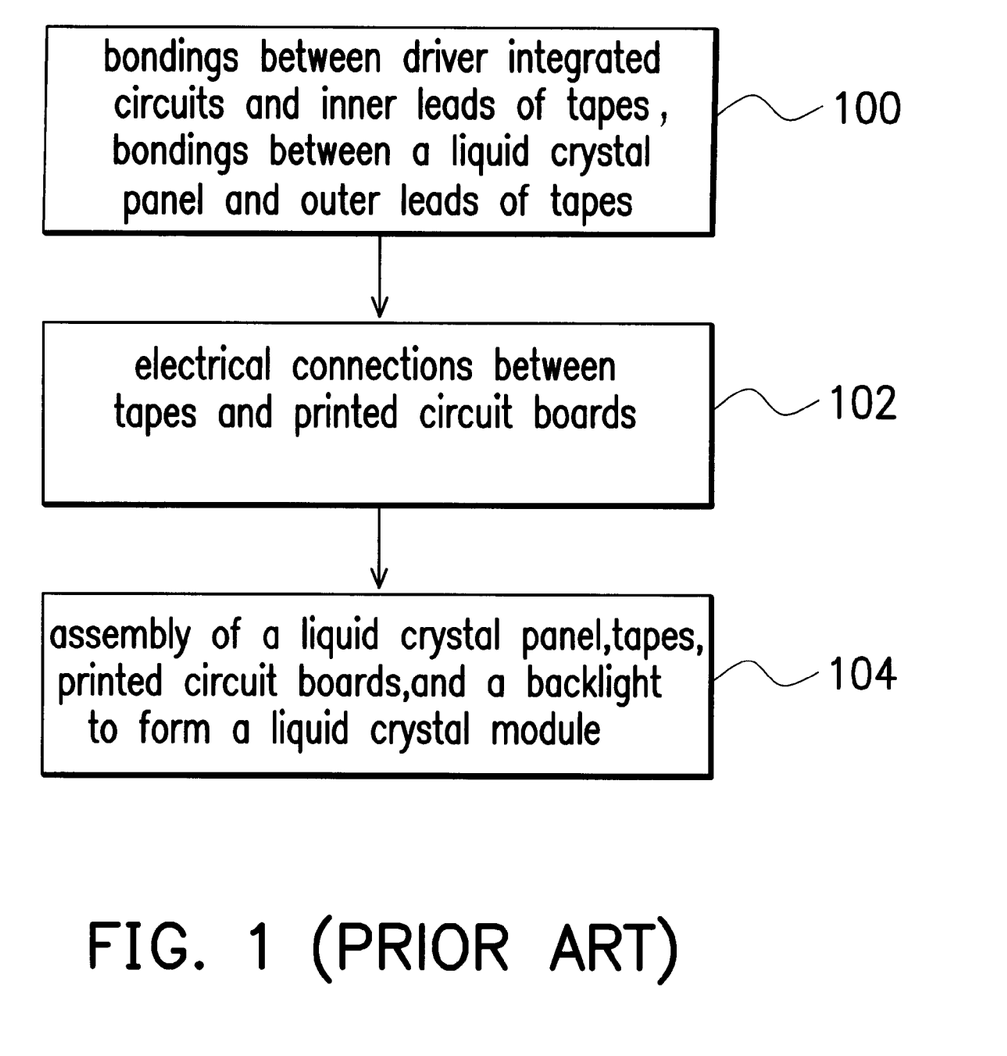
FIG. 1 is a flow chart showing the assembly process of a liquid crystal module (LCM) by means of the prior art tape automated bonding (TAB) process.
Figure 2:
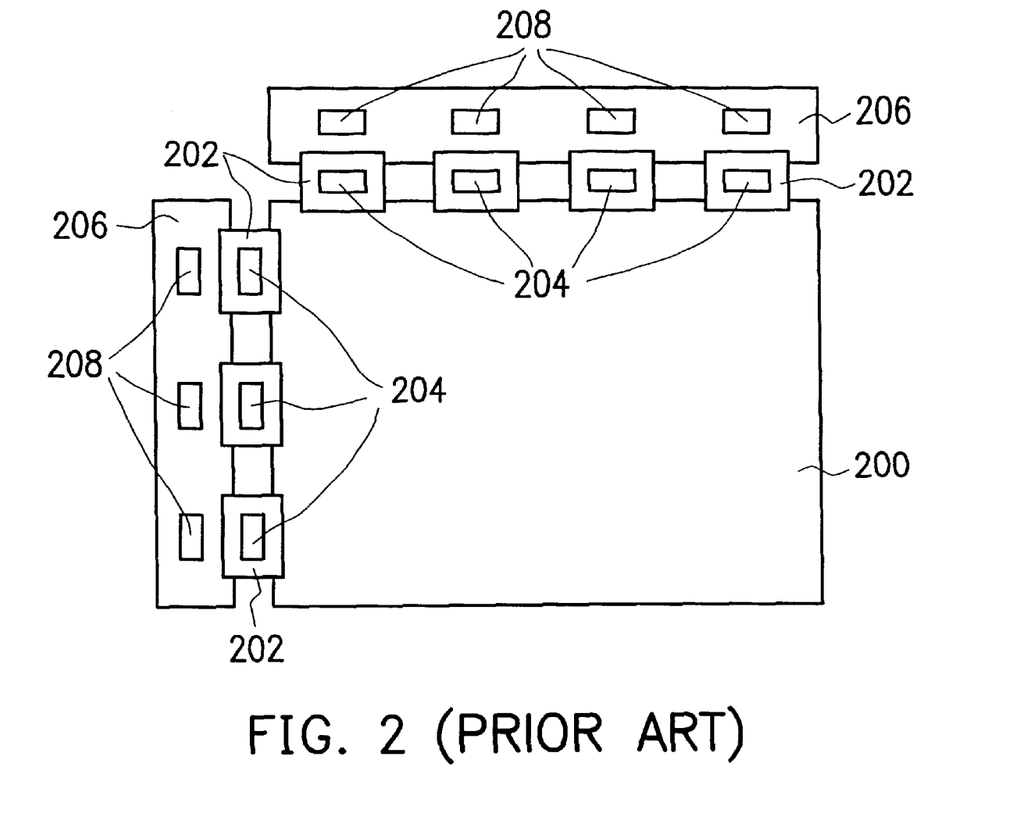
FIG. 2 is a top view of a liquid crystal module fabricated by means of the prior art tape automated bonding process.
Figure 3:
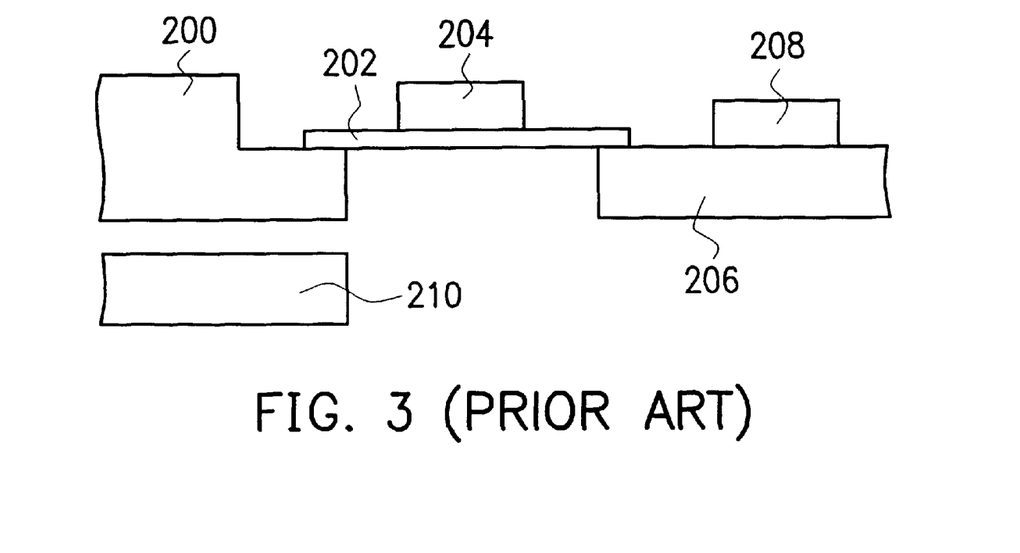
FIG. 3 is a schematic, cross-sectional view of a liquid crystal display module fabricated by means of the prior art tape automated bonding technique.

FIG. 1 illustrates a flow chart for the assembly process of a liquid crystal module (LCM) by means of the prior art tape automated bonding process. FIGS. 2 and 3 illustrate a top view and a schematic, cross-sectional view, respectively, of a liquid crystal module fabricated by means of the prior art tape automated bonding process.

Reference is made to FIG. 1. According to a step 100 shown in FIG. 1, bumps are fabricated on a driver integrated circuit (IC) first. An inner lead bonding (ILB) process is performed which mounts the driver IC to inner leads of a tape. After encapsulation and testing, an outer lead bonding (OLB) process is performed in which outer leads of the tape is electrically connected to terminals located on an edge of a liquid crystal panel by means of an anisotropic conductive film (ACF).

Then, a step 102 shown in FIG. 1 follows. By employing an ACF or solder, the tape with driver IC is connected to a PCB. A LCD is controlled under an active matrix driving manner by different functions ICs on the PCB and the driver IC on the tape to produce desired patterns.

A step 104 shown in FIG. 1 is performed. A backlight, a bezel, a frame, etc., the liquid crystal panel, the tape with driver IC, and the PCB together forms a liquid crystal module.

Reference is made to FIGS. 2 and 3, in which a top view and a schematic, cross-sectional view of a liquid crystal module fabricated by means of the prior art tape automated bonding process are illustrated, respectively. Driver ICs 204 are mounted on tapes 202. The tapes 202 are then respectively connected to a liquid crystal panel 200 and PCBs 206. Other ICs 208 are mounted to the PCBs 206 as well. A backlight 210 is located under the liquid crystal panel 200 in order to provide a light source.

The COG process, also named as the flip chip on glass process (FCOG), is a flip chip bonding process, which electrically connects driver chips to a liquid crystal panel by means of eutectic metals, polymer resins, or conductive adhesives as connecting media. Bumps of the chips and terminals of a panel are electrically connected for isotropic and anisotropic conduction.

Currently TFT-LCD structure mainly employs the TAB and the FCOG processes for its fabrication. Typical small and medium size (up to about 7 inches) TFT-LCDs employ the FCOG process. For large size TFT-LCDs (over about 12 inches), the TAB process is still be employed in common.

Both the COB process and the TAB process involve the use of PCBs for providing electrical connection paths between a liquid crystal panel and external circuits. However, a pitch width below 180 microns is very difficult to achieve in the PCB manufacture. The COB process can only provide low I/O lead-counts. Even the TAB process still employs PCBs. For the COG process, it involves the solder bump formation, the flip-chip bonding process, and the encapsulation process, and hence, its application in mass production of large size LCD (over about 12 inches) assembly is still not possible.

SUMMARY OF THE INVENTION

Based on the foregoing, the present invention provides a display driver integrated circuit module, which is applicable to a liquid crystal module assembly. Driver ICs are mounted to a flexible base film and electrically connected to it to form the display driver IC module. An application of the display driver IC module in the liquid crystal module assembly can reduce the amount of using PCBs, simplify the manufacturing process, reduce the production cost, the overall size and thickness, the weight, and it is suitable for large size LCD manufacture.

Accordingly, the present invention provides a display driver IC module which is applicable to a liquid crystal module assembly. The display driver IC module comprises a flexible base film and a plurality of driver ICs. The flexible base film includes an interconnecting wiring. Each driver ICs is mounted to the flexible base film, and having a plurality of input/output (I/O) pads electrically connected to the interconnecting wiring. Each driver IC is electrically connected to the corresponding input/output pads of the other driver ICs through the interconnecting wiring on the flexible base film.

Moreover, the present invention provides a structure and method of manufacturing a liquid crystal module. The liquid crystal module includes a display driver IC module, a liquid crystal panel, a backlight, etc. Driver ICs are first connected to a flexible base film to form the display drive IC module. The flexible base film includes an interconnecting wiring fabricated on it. Each driver IC includes a plurality of I/O pads electrically connected to the interconnecting wiring on the flexible base film. Each driver IC is electrically connected to the corresponding I/O pads of the other driver ICs through the interconnecting wiring on the flexible base film. Furthermore, a connecting material is employed for electrical connection between the display driver IC module and the liquid crystal panel. The backlight is located under the liquid crystal panel to form the liquid crystal module.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 4:
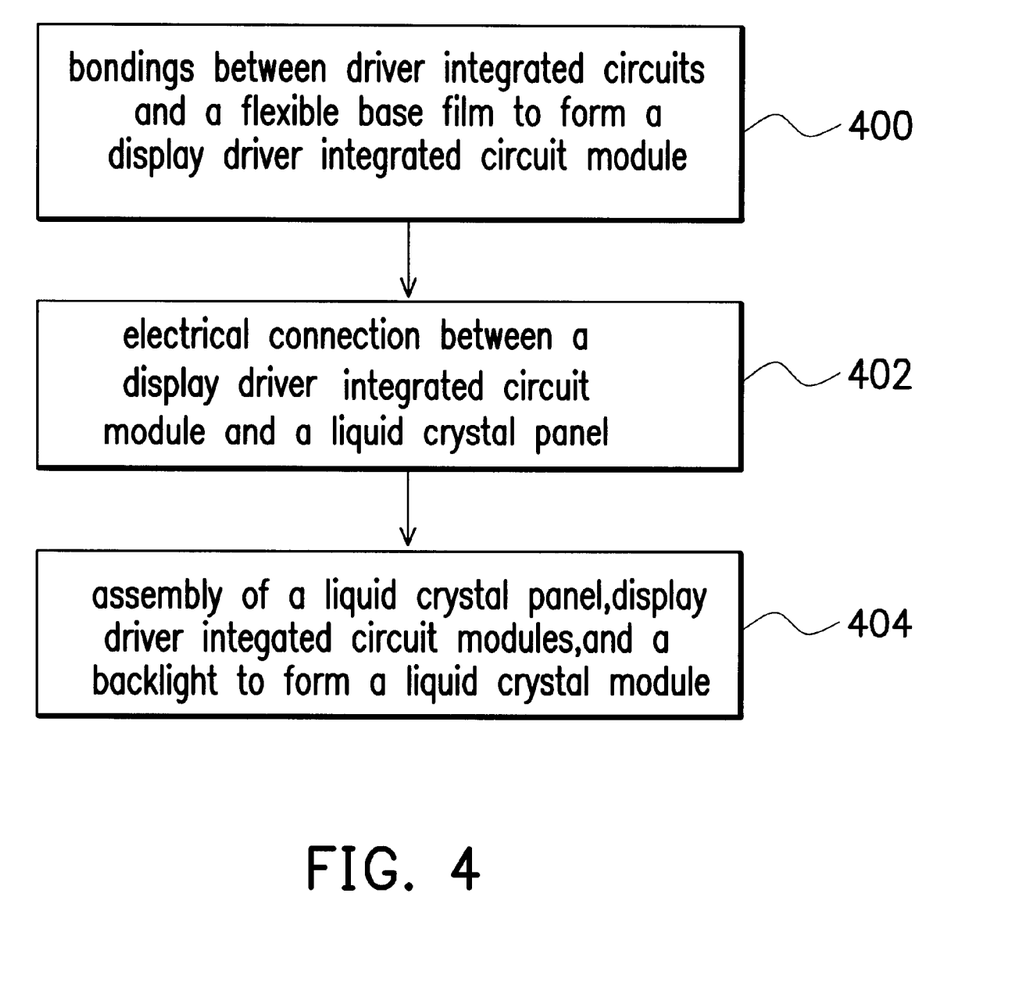
FIG. 4 is a flow chart showing the assembly process of a liquid crystal module by means of a display driver integrated circuit (IC) module in accordance with a preferred embodiment of the present invention.

An object of fabricating a liquid crystal module (LCM) is to electrically connect a driver integrated circuit (IC) with a driver circuit to a liquid crystal panel for transmitting, controlling and processing electrical signals. Reference is made to FIG. 4 which illustrates a flow chart for the assembly process of a liquid crystal module by means of a display driver IC module in accordance with a preferred embodiment of the present invention.

A step 400 shown in FIG. 4 comprises the steps of providing a plurality driver ICs and a flexible base film, and electrically connecting the driver ICs to the flexible base film by means of, for example, the tape automated bonding (TAB) process or the chip on film (COF) process, to form a display driver IC module. An interconnecting wiring is fabricated on the flexible base film.

Figure 5:
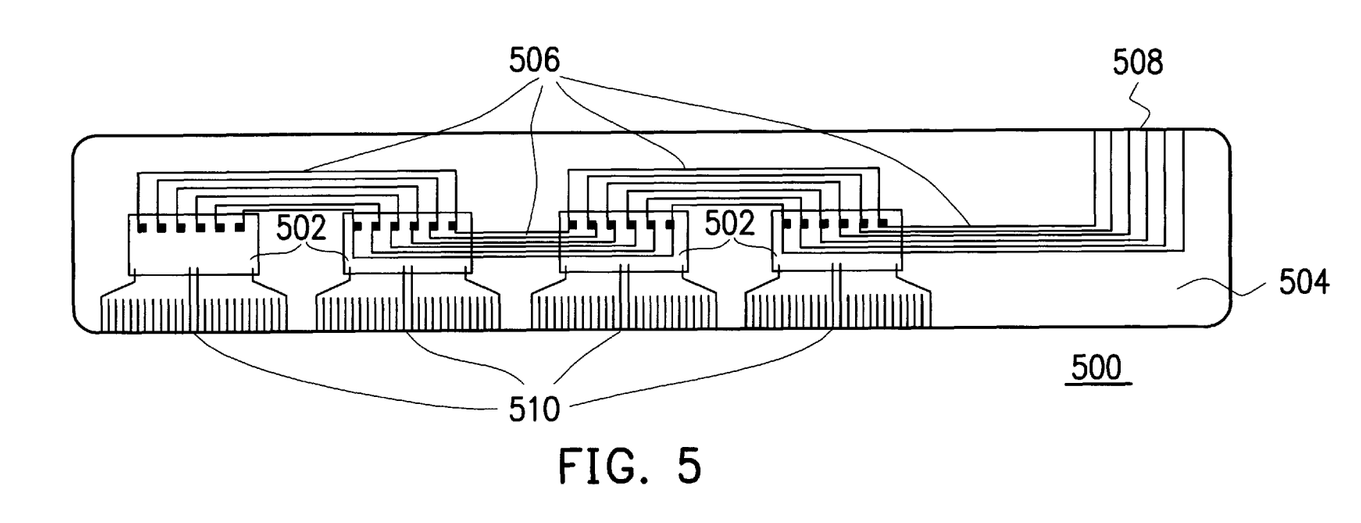
FIG. 5 is a top view of a display driver IC module in accordance with a preferred embodiment of the present invention.
Figure 6A:
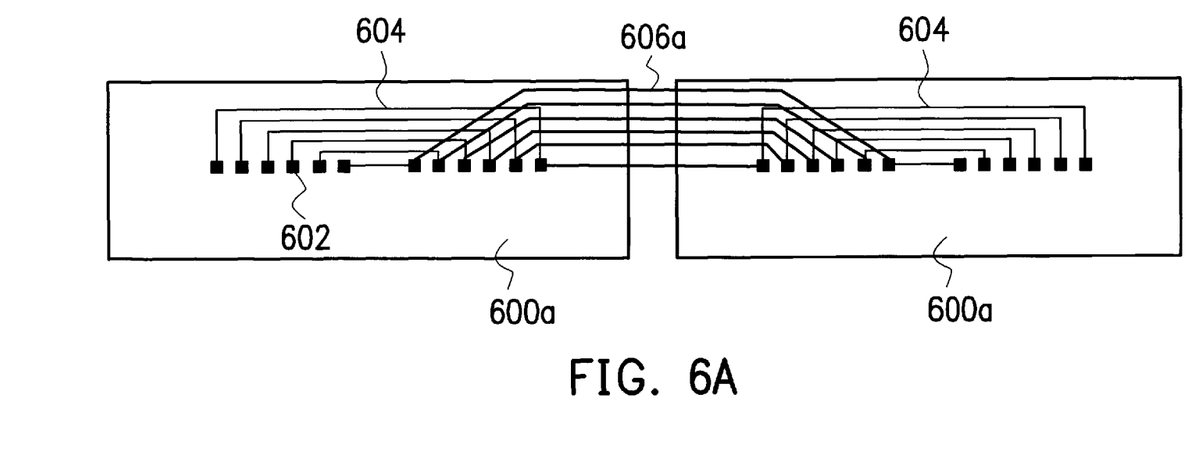
FIG. 6A illustrates a wiring layout of driver ICs for a display driver IC module in accordance with a preferred embodiment of the present invention.
Figure 6B:
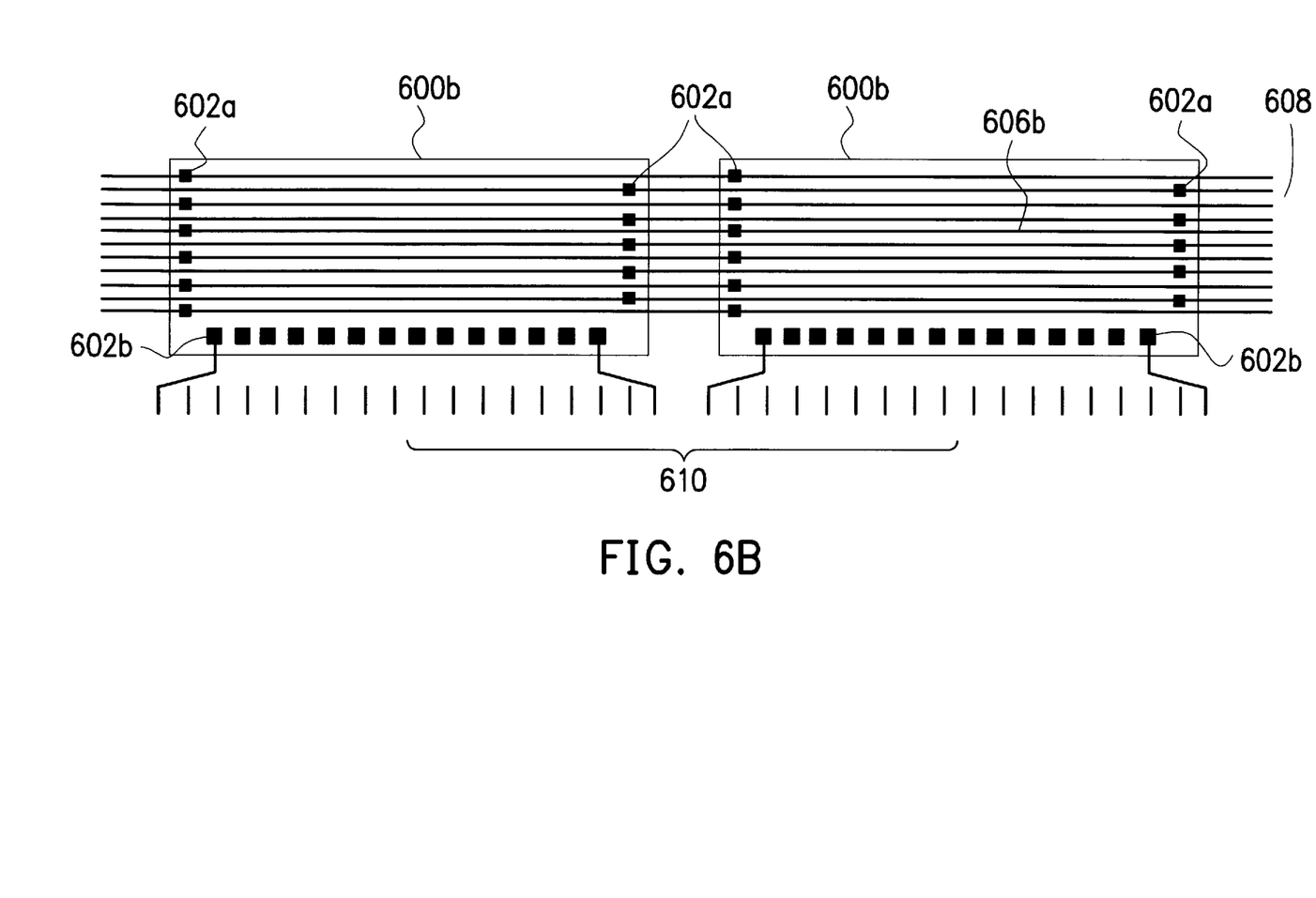
FIG. 6B illustrates another wiring layout of driver ICs for a display driver IC module in accordance with a preferred embodiment of the present invention.

FIG. 5 illustrates a top view of a display driver IC module in accordance with a preferred embodiment of the present invention. FIG. 6A illustrates a wiring layout of driver ICs for a display driver IC module in accordance with a preferred embodiment of the present invention, and FIG. 6B illustrates another wiring layout of driver ICs for a display driver IC module in accordance with a preferred embodiment of the present invention.

Reference is made to FIG. 5, and according to the step 400 shown in FIG. 4, a display driver IC module 500 includes a plurality of driver ICs 502 and a flexible base film 504. The flexible base film 504 includes a flexible printed circuit board (FPCB) and a micro flex (MF), etc. A preferred material of the flexible base film 504 is polyimide or a flexible circuit film. Non-intersecting interconnecting wiring 506 is fabricated on the flexible base film 504 for electrical connections between the driver ICs 502 and external circuits, and between the driver ICs 502 and a liquid crystal panel. The driver ICs 502 are electrically connected to the interconnecting wiring 506 on the flexible base film 504. The driver ICs 502 are also electrically connected to one another by the non-intersecting interconnecting wiring 506. Transmitting, controlling, and processing electrical signals are accomplished by electrically connecting the display driver IC module to the external circuits and the liquid crystal panel through signal input terminals 508 and signal output terminals 510 of the interconnecting wiring 506, respectively.

The flexible base film 504 of the display driver IC module 500 shown in FIG. 5 is, for example, a single-sided board structure. In other words, the COF process is employed for the flexible base film 504 formation. However, this is just an example in the preferred embodiment of the present invention and does not intend to limit the present invention in any ways. Indeed, the flexible base film 504 can also be a double-sided substrate or a laminated substrate. Even mounting the driver ICs to both surfaces of the flexible base film 504 is allowable.

Reference is made to FIG. 6A. Input pads 602a and an inner-connecting wiring 604 on a driver IC 600a of the display driver IC module (item 500 in FIG. 5) have to be designed to match non-intersecting interconnecting wiring 606a on the flexible base film (item 504 in FIG. 5). The inner-connecting wiring 604 are used to connect the input pads together 602a within the driver IC 600a. The driver IC 600a is electrically connected to the non-intersecting interconnecting wiring 606a on the flexible base film via the input pads 602a and output pads (not shown). Electrical connections between the input pads 602a on the driver IC 600a and the corresponding input pads 602a on another driver IC 600a are established by means of the interconnecting wiring 606a.

Reference is made to FIG. 6B, in which a side input pad design is employed for a wiring layout of driver ICs 600b. Similar to FIG. 6A, electrical connections between the driver ICs 600b and non-intersecting interconnecting wiring 606b on the flexible base firm (item 504 in FIG. 5) are established by means of input pads 602a and output pads 602b. The input pads 602a on opposite sides of the driver ICs are alternately formed and therefore only the corresponding pads on the same side of each driver IC are connected by the non-intersecting interconnecting wiring 606b on the flexible base firm. The output pads 602b are formed on the bottom of the driver IC as to connect to output terminal 610 on the flexible base film. As a result, all the driver ICs 600b are electrically connected to one another and to the input terminal 608. Through signal input terminals 608 and signal output terminals 610 of the non-intersecting interconnecting wiring 606b, electrical connections to external circuits and a liquid crystal panel are established, respectively, for signal transmission and processing.

In the wiring layout on the driver ICs 600a shown in FIG. 6A, a mirror design is. employed for the I/O pads 602 arrangement. Again, this is just an example in the preferred embodiment of the present invention and does not intend to limit the present invention in any ways. Indeed, a double input pad or a side input pad (as shown in FIG. 6B) design can be employed for the wiring layout on the driver IC, in order to match the interconnecting wiring on the flexible base film (item 504 in FIG. 5) for establishing electrical connections.

Reference is made again to FIG. 4. According to a step 402, an outer lead bonding process is performed in which the interconnecting wiring on the display driver IC module described above and terminals along an edge of a liquid crystal panel are electrically connected through a connecting material. For example, an anisotropic conductive film (ACF) is employed for establishing electrical connections between outer leads of the display driver IC module and the terminals along the edge of the liquid crystal panel. A liquid crystal display is controlled by the driver IC's under an active matrix driving manner to show a desired pattern. A step 404 shown in FIG. 4 then follows, in which a backlight, bezel, frame, etc. are assembled together with the panel and the display driver IC module to form a liquid crystal module (LCM).

Figure 7:
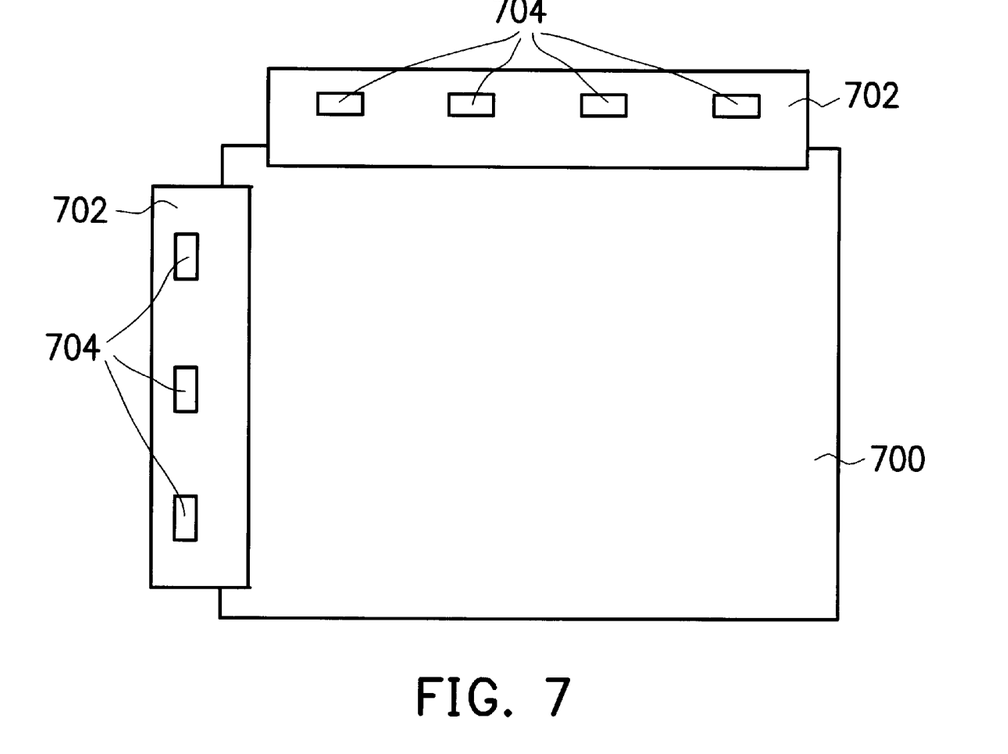
FIG. 7 is a top view of a liquid crystal module fabricated by means of a display driver IC module in accordance with a preferred embodiment of the present invention.
Figure 8:
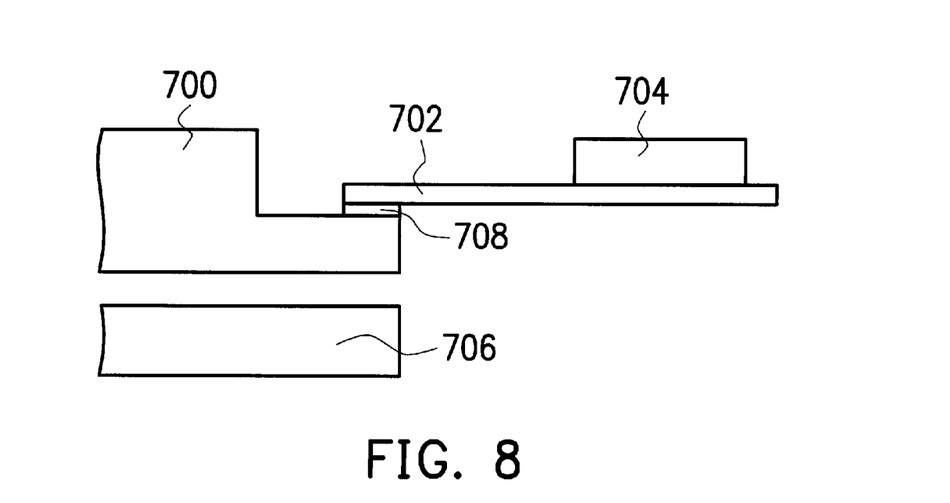
FIG. 8 is a schematic, cross-sectional view of a liquid crystal module fabricated by means of a display driver IC module in accordance with a preferred embodiment of the present invention.

FIGS. 7 and 8 illustrate, respectively, a top view and a schematic, cross-sectional view of a liquid crystal module fabricated by means of a display driver IC module in accordance with a preferred embodiment of the present invention. As shown in FIG. 7, an interconnecting wiring (item 506 in FIG. 5) is fabricated on a flexible base film 702 of a display driver IC module. Driver ICs 704 are mounted to a surface of the flexible base film 702 and electrically connected to the interconnecting wiring on the flexible base film 702. As described above, I/O pads (item 602 in FIG. 6A) of the driver IC 704 is electrically connected to the interconnecting wiring on the flexible base film 702. Electrical connections between the I/O pads on the driver IC 704 and the I/O pads on the corresponding driver IC 704 are established by means of the interconnecting wiring. Through signal input and output terminals (items 508 and 510 in FIG. 5) of the interconnecting wiring on the flexible base film 702, electrical connections to external circuits and the liquid crystal panel are established, respectively, for signal transmission and processing.

By means of a connecting material, electrical connections between the signal output terminals of the interconnecting wiring on the flexible base films 702 and terminals along edges of the liquid crystal panel 700 are established. A liquid crystal display is controlled by the driver ICs 704 mounted to the flexible base films 702 under an active matrix driving manner to show a desired pattern. As shown in FIG. 8, the electrical connection between the liquid crystal panel 700 and the flexible base film 702 are by means of the connecting material 708. Materials of the connecting material 708 include an anisotropic conductive film. A backlight is located under the liquid crystal panel 700 to provide a light source. The driver ICs 704 and the flexible base films 702 together forms a display driver IC module. The display driver IC module, the liquid crystal panel 700, the backlight, the bezel, the frame, etc. further forms a liquid crystal module.

Based on the foregoing, the present invention is applicable to the assembly of a liquid crystal module. A plurality of driver ICs is first mounted on a flexible base film such as a FPCB, a MF, etc. to form a display driver IC module, which drives and controls a liquid crystal panel. Electrical connections are then established between the display driver IC module and the liquid crystal panel. A backlight, a bezel and a frame, etc. are included to form a liquid crystal module.

By employing the display driver IC module of the present invention to assemble a liquid crystal module, the amount of PCBs required is reduced. A bonding process for connections between the PCBs and tapes is omitted. Hence, the manufacturing process is simplified and both the manufacturing and assembly costs can be reduced. Moreover, a flexible base film with an interconnecting wiring fabricated on its surface is employed as a substrate in accordance with the present invention. With the characteristics of thin, light, and flexible, the overall size, thickness, and weight of the formed liquid crystal module can be reduced, and hence, is suitable for manufacturing large size liquid crystal module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display driver integrated circuit module, comprising:
   a flexible base film having non-intersecting interconnecting wiring with a plurality of signal input terminals and a plurality of signal output terminals, where the signal output terminals are electrically connected to a liquid crystal panel; and
   a plurality of driver integrated circuits mounted on the flexible base film where each of the driver integrated circuit has a plurality of input/output pads electrically connected to the non-intersecting interconnecting wiring and the input pads electrically connected to the corresponding input pads of another driver integrated circuit,
   wherein the input pads are alternately formed on opposite sides of the driver integrated circuit with input pads on one side of the driver integrated circuit electrically connected to the corresponding input pads on the same side of another driver integrated circuit by the non-intersecting interconnecting wiring on the flexible base film.

2. The display driver integrated circuit module of claim 1, wherein the flexible base film includes a flexible print circuit board (FPCB).

3. The display driver integrated circuit module of claim 1, wherein the flexible base film includes a micro flex (MF).

4. The display driver integrated circuit module of claim 1, wherein a material of the flexible base film includes polyimide.

5. A liquid crystal module, comprising:
   a display driver integrated circuit module, further comprising:
      a flexible base film having non-intersecting interconnecting wiring with a plurality of signal input terminals and a plurality of signal output terminals;

a plurality of driver integrated circuits mounted on the flexible base film where each of the driver integrated circuit has a plurality of input/output pads electrically connected to the non-intersecting interconnecting wiring and the input pads electrically connected to the corresponding input pads of another driver integrated circuit, wherein the input pads are alternately formed on opposite sides of the driver integrated circuit with input pads on one side of the driver integrated circuit electrically connected to the corresponding input pads on the same side of another driver integrated circuit by the non-intersecting interconnecting wiring on the flexible base film; and a liquid crystal panel where the signal output terminals of the flexible base film are electrically connected to an edge of the liquid crystal panel.

6. The liquid crystal module of claim 5, wherein the flexible base film includes a flexible printed circuit board (FPCB).

7. The liquid crystal module of claim 5, wherein the flexible base film includes a micro flex (MF).

8. The liquid crystal module of claim 5, wherein a material of the flexible base film includes polyimide.

9. The liquid crystal module of claim 5, wherein a connecting material is disposed between the signal output terminals and the liquid crystal panel for electrical connection establishment.

10. The liquid crystal module of claim 9, wherein the connecting material includes an anisotropic conductive film.

11. The liquid crystal module of claim 5, wherein a backlight is included and located on a surface of the liquid crystal panel.

12. A display driver integrated circuit module, comprising:

a flexible base film having non-intersecting interconnecting wiring with a plurality of signal input terminals and a plurality of signal output terminals, where the signal output terminals are electrically connected to a liquid crystal panel; and a plurality of driver integrated circuits mounted on the flexible base film, wherein each of the driver integrated circuit has a plurality of input/output pads electrically connected to the nonintersecting interconnecting wiring, the input pads electrically connected to the corresponding input pads of another driver integrated circuit, and inner-connecting wiring formed on the driver integrated circuits, which electrically connect the input pads of the driver integrated circuit to the corresponding input pads of the same driver integrated circuit.

13. A liquid crystal module, comprising:

a display driver integrated circuit module, further comprising:

a flexible base film having non-intersecting interconnecting wiring with a plurality of signal input terminals and a plurality of signal output terminals;

a plurality of driver integrated circuits mounted on the flexible base film, wherein each of the driver integrated circuit has a plurality of imput/output pads electrically connected to the non-intersecting interconnecting wiring, the input pads electrically connected to the corresponding input pads of another driver integrated circuit, and inner-connecting wiring formed on the driver integrated circuits, which electrically connect the input pads of the driver integrated circuit to the corresponding input pads of the same driver integrated circuit; and a liquid crystal panel where the signal output terminals of the flexible base film are electrically connected to an edge of the liquid crystal panel.

* * * * *